US008898717B1

(12) United States Patent
Labrozzi et al.

(10) Patent No.: US 8,898,717 B1
(45) Date of Patent: Nov. 25, 2014

(54) SYSTEM AND METHOD FOR OBFUSCATING START-UP DELAY IN A LINEAR MEDIA SERVICE ENVIRONMENT

(75) Inventors: Scott C. Labrozzi, Cary, NC (US); James M. Hill, Holly Springs, NC (US); Adrian P. Phillips, Holly Springs, NC (US); Mahesh Viveganandhan, Cupertino, CA (US); William C. VerSteeg, Buford, GA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 13/348,094

(22) Filed: Jan. 11, 2012

(51) Int. Cl.
*H04N 7/173* (2011.01)

(52) U.S. Cl.
USPC ........................................................ 725/114

(58) Field of Classification Search
None
See application file for complete search history.

(56) References Cited

U.S. PATENT DOCUMENTS

| | | | |
|---|---|---|---|
| 5,553,061 | A | 9/1996 | Waggener et al. |
| 6,167,030 | A | 12/2000 | Kilkki et al. |
| 6,345,307 | B1 * | 2/2002 | Booth ............................ 709/247 |
| 6,493,386 | B1 | 12/2002 | Vetro et al. |
| 6,542,546 | B1 | 4/2003 | Vetro et al. |
| 6,804,198 | B1 | 10/2004 | Iwamoto |
| 7,245,586 | B2 | 7/2007 | Bitar et al. |
| 7,961,607 | B2 | 6/2011 | De Cnodder et al. |
| 8,301,982 | B2 | 10/2012 | Ver Steeg et al. |
| 2001/0047517 | A1 | 11/2001 | Christopoulos et al. |
| 2003/0030752 | A1 * | 2/2003 | Begeja et al. ................. 348/563 |
| 2003/0236904 | A1 | 12/2003 | Walpole |
| 2005/0055712 | A1 * | 3/2005 | Whyte et al. ..................... 725/42 |
| 2007/0008986 | A1 | 1/2007 | Xie et al. |
| 2007/0022185 | A1 * | 1/2007 | Hamilton et al. .............. 709/220 |
| 2007/0033623 | A1 * | 2/2007 | Fredrickson et al. ............ 725/88 |
| 2007/0280232 | A1 * | 12/2007 | Dec et al. ......................... 370/390 |
| 2008/0263219 | A1 | 10/2008 | Bacchi et al. |
| 2011/0072148 | A1 | 3/2011 | Begen et al. |
| 2011/0082924 | A1 | 4/2011 | Gopalakrishnan |
| 2011/0138020 | A1 * | 6/2011 | Pantos et al. ................... 709/219 |
| 2011/0289538 | A1 | 11/2011 | Begen et al. |
| 2012/0128061 | A1 | 5/2012 | Labrozzi et al. |
| 2012/0176540 | A1 | 7/2012 | Labrozzi et al. |
| 2012/0254456 | A1 | 10/2012 | Visharam et al. |

FOREIGN PATENT DOCUMENTS

| | | |
|---|---|---|
| EP | 1622385 | 2/2005 |
| WO | WO2006/004472 | 1/2006 |
| WO | WO2011/015243 | 2/2011 |
| WO | WO2012/145108 | 10/2012 |
| WO | WO2013/116554 | 8/2013 |

OTHER PUBLICATIONS

U.S. Appl. No. 13/088,927, filed Apr. 11, 2011 entitled "System and Method for Data Streaming in a Computer Network," Inventors: Robert D. Major, et al.

(Continued)

*Primary Examiner* — Nathan Flynn
*Assistant Examiner* — William J Kim
(74) *Attorney, Agent, or Firm* — Patent Capital Group

(57) ABSTRACT

A method is provided in one example embodiment that includes receiving a request for a linear media service and determining that the linear media service is not available. An upstream server is provided with start-up content that is streamed in response to the linear media service not being available. The method also includes switching to the linear media service if the linear media service becomes available. In certain example implementations, the upstream server is an origin server, a residential gateway, an edge cache, an endpoint, etc.

20 Claims, 13 Drawing Sheets

(56) References Cited

OTHER PUBLICATIONS

U.S. Appl. No. 13/363,933, filed Feb. 1, 2012 entitled "System and Method to Reduce Stream Start-Up Delay for Adaptive ," Inventors: David R. Oran, et al.

Adobe Systems Incorporated, "Flexible delivery of on-demand and live video streaming," © 2011, 3 pages, http://www.adobe.com/products/httpdynamicstreaming/.

Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789.

Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

ISO/IEC 13818-1 International Standard, "Information Technology—Generic Coding of Moving Pictures and Associated Audio Information: Systems," Dec. 1, 2000, © ISO/IEC 2000; printed in Switzerland; 174 pages.

MPEG Transport Stream from Wikipedia, the free encyclopedia; 7 pages [Retrieved and printed Sep. 6, 2012] http://enwikipedia.org/wiki/MPEG_transport_stream.

MPEG-2 from Wikipedia, the free encyclopedia; 32 pages [Retrieved and printed Sep. 6, 2012] http://en.wikipedia.org/wiki/MPEG-2.

Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.

Pantos, R., "HTTP Live Streaming," Informational Internet Draft, Nov. 19, 2010, 23 pages, http://tools.ietf.org/html/draft-pantos-http-live-streaming-05.

Pantos, R., "HTTP Live Streaming," Informational Internet Draft, Sep. 30, 2011, 34 pages, http://tools.ietf.org/html/draft-pantos-http-live-streaming-07.

PCT Jun. 3, 2013 International Search Report and Written Opinion from International Application Serial No. PCT/US2013/024197 10 pages.

PCT—Jun. 14, 2012 International Search Report and Written Opinion from International Application Serial No. PCT/US2012/029691 10 pages.

USPTO Dec. 7, 2012 Non-Final Office Action from U.S. Appl. No. 13/088,927.

USPTO Mar. 7, 2013 Response to Dec. 7, 2012 Non-Final Office Action from U.S. Appl. No. 13/088,927.

USPTO Jul. 2, 2013 Final Office Action from U.S. Appl. No. 13/088,927.

USPTO Oct. 2, 2013 RCE Response to Jul. 2, 2013 Final Office Action from U.S. Appl. No. 13/088,927.

U.S. Appl. No. 14/051,234, filed Oct. 13, 2013, entitled "Virtual Assets for On-Demand Content Generation," Inventor(s) Mahesh Vittal Viveganandhan, et al.

PCT—Oct. 22, 2013 International Preliminary Report on Patentability from International Application Serial No. PCT/US2012/029691 10 pages.

USPTO Nov. 8, 2013 Notice of Allowance from U.S. Appl. No. 13/088,927.

USPTO Jan. 1, 2014 Non-Final Office Action from U.S. Appl. No. 13/363,933.

* cited by examiner

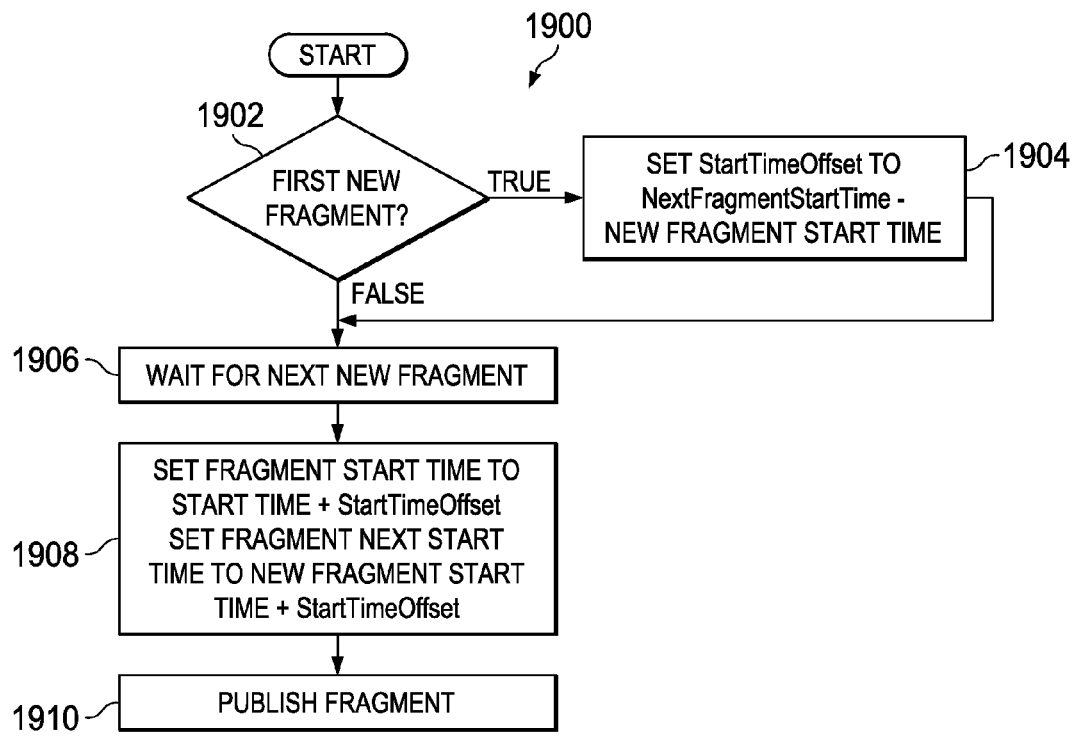

SYSTEM AND METHOD FOR OBFUSCATING START-UP DELAY IN A LINEAR MEDIA SERVICE ENVIRONMENT

TECHNICAL FIELD

This disclosure relates in general to the field of media services and, more particularly, to a system and a method for obfuscating start-up delay in a linear media service environment.

BACKGROUND

The next generation of television promises to provide an immersive home and mobile media entertainment experience that is simpler for consumers to operate. Content providers can use the cloud, the network, and client devices to deliver new media experiences over the Internet, with access to vast entertainment content sources, including broadcast channels, pay TV, and the Web, which can integrate the Internet, social media, and mobility features. However, the entertainment experience should also be robust, reliable, and offer a high-quality experience comparable to (or better than) traditional cable networks. Designing and deploying such a system continues to present significant challenges to manufacturers and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 19 is a simplified flow diagram illustrating potential operations that may be associated with switching to service fragments in other example embodiments of the distribution system with an HTTP Smooth Streaming service; and FIG. 20 is a simplified table that illustrates switching from primed start-up fragments to service fragments in an example embodiment of the distribution system with an HTTP Smooth Streaming service.

DETAILED DESCRIPTION OF EXAMPLE EMBODIMENTS

Overview

A method is provided in one example embodiment that includes receiving a request (e.g., a request from an endpoint) for a linear media service and determining that the linear media service is not available. The request can be in any suitable format or form (e.g., a hardware implementation) and, further, the request can be sent over a network connection via one or more packets. The linear media service can be virtually any data service (e.g., a television service, a video service more generally, a streaming service of any kind, a service associated with recording, a pay per view service, a service associated with music, etc.) to be provided to a given endpoint, server, device, etc. An upstream server is provided with start-up content that is streamed in response to the linear media service not being available. The method also includes switching to (i.e., transitioning to, changing to, etc.) the linear media service if the linear media service becomes available.

In certain example implementations, the upstream server can be an origin server, a residential gateway, an edge cache, an endpoint, etc. In other example architectures, the method may also include looping the start-up content if the start-up content is insufficient to allow playback; caching the start-up content on the upstream server before receiving the request; and periodically publishing the start-up content to the upstream server after receiving the request until switching to the linear media service.

Other example methods may include adding segments of the start-up content to a playlist; and adding a discontinuity tag to loop the segments in the playlist if the segments are insufficient to allow playback. In yet other examples, switching to the linear media service can include adding a discontinuity tag to a playlist before adding a first segment from the linear media service to the playlist. Additionally, the method may include publishing (i.e., sending, communicating, transmitting, writing to, etc.) fragments of the start-up content to the upstream server; and modifying start times of the fragments to loop the start-up content. Switching to the linear media service may include modifying a next fragment start time of a last fragment of the start-up content to match the start time of a first fragment of the linear media service. Switching to the linear media service may alternatively include modifying start times of fragments from the linear media service.

Example Embodiments

Figure 1:
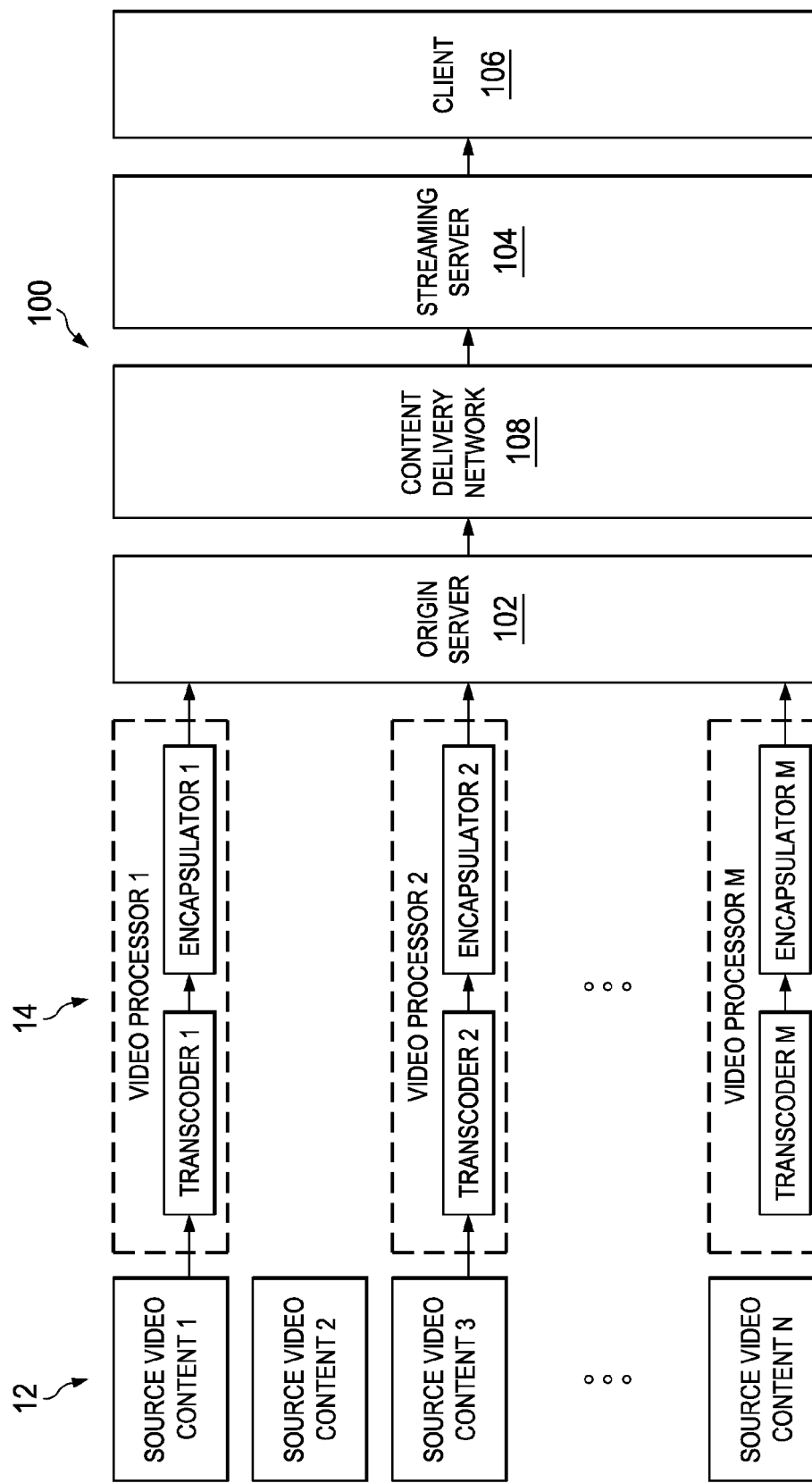
FIG. 1 is a simplified block diagram illustrating an example embodiment of a media distribution system in accordance with this disclosure.

Turning to FIG. 1, FIG. 1 is a simplified block diagram of an example embodiment of a media distribution system 100 for providing a switched linear media service in accordance with this disclosure. Distribution system 100 may include media content sources such as source video content sources 1-N (generally indicated at an arrow 12), upstream servers such as an origin server 102 and a streaming server 104 (e.g., an edge cache), and an endpoint such as client 106. In this context, an upstream server broadly includes any server that is upstream of an endpoint. Distribution system 100 may also include video processors 1-M (generally indicated at an arrow 14). Transcoders 1-M and encapsulators 1-M may be integrated with or coupled to video processors 1-M, respectively. Video processors 1-M may process source video content from sources 1-N prior to distribution to origin server 102. For example, the content may be encoded or transcoded from its original form at an elementary level and further encapsulated, packaged, multiplexed, and/or encrypted into a format appropriate for final consumption. In some embodiments, distribution system 100 may also include a content delivery network (CDN) 108 to provide bandwidth-efficient delivery of content to client 106 or other endpoints, including set-top boxes, personal computers, game consoles, smartphones, tablet devices, iPads, iPhones, Google Droids, customer premises equipment, or any other suitable endpoint. Streaming server 104 may also be integrated with or coupled to an edge cache, gateway, or other network element. For example, in some embodiments, streaming server 104 may be integrated with customer premises equipment (CPE), such as a residential gateway (RG).

Each of the elements of FIG. 1 may couple to one another through simple interfaces (tangible or virtual) or through any other suitable connection (wired or wireless), which provides a viable pathway for network communications. Additionally, any one or more of these elements may be combined or removed from the architecture based on particular configuration needs. Distribution system 100 may include a configuration capable of transmission control protocol/Internet protocol (TCP/IP) communications for the transmission or reception of packets in a network. Distribution system 100 may also operate in conjunction with a user datagram protocol/IP (UDP/IP) or any other suitable protocol where appropriate and based on particular needs.

For purposes of illustrating certain example embodiments of distribution system 100, it is important to understand certain activities and communications occurring within such a system. The following foundational information may be viewed as a basis from which the present disclosure may be properly explained. Such information is offered earnestly for purposes of explanation only and, accordingly, should not be construed in any way to limit the broad scope of the present disclosure and its potential applications.

A linear media service provides a content experience to end users with the concept of a live play-out point that is likely shared with many other subscribers. For example, video viewed on a linear service can include live events, such as sporting events and breaking news. In these kinds of programs, viewers are interested in seeing the events as they happen, which leads to high concurrency in the delivery of the video service to multiple clients in a given area.

Linear media service resources can be expensive: particularly video processing resources that use adaptive bitrate (ABR) encoding. In ABR encoding, a single source may be transcoded into many representations, such as representations with different bitrates and resolutions, for example. The processing cost to prepare a single source asset in an ABR video delivery system can increase significantly over traditional delivery models.

Since some content may be infrequently viewed, using a smaller pool of resources and switching on a resource when needed can conserve some of these expensive resources. Thus, the number of video processors M (in FIG. 1) is generally less than the number of sources N. A processing resource may be switched on and assigned to a video content source when needed, and then switched off again when no longer needed. For example, a client can request a new service, such as when the client is turning on or is changing from one service (or channel) to another, and the client can be told where to consume the new service. This switching model (referred to generally herein as a "switched linear service") can produce cost savings by utilizing resources more efficiently.

In an established linear flow, processing resources (e.g., transcoders/encapsulators) are already publishing content, data, and possibly manifests (also referred to as playlists for some formats) to an origin server. A client's first request for a service is a request for manifest(s) that provides information (e.g., a uniform resource identifier) for obtaining content. A client can subsequently make a request for data and possibly manifest updates. The transcoder/encapsulator resources can provide updated data and possibly manifests updates at periodic intervals (e.g., based on specific ABR format configurations).

However, if the service is not yet established (i.e., switched on), then there is no initial manifest or subsequent data to provide to a client, and initial processing in a switched liner service can have a significant start-up delay before data can be made available to the client. Some ABR formats typically have a start-up delay greater than thirty seconds. ABR clients also buffer content before starting playback, which further increases the delay from the time at which content enters the processing resources to the time the same content is rendered by the client. Thus, when a client initially requests a switched linear service, the service may not be available for a while.

In some implementations, service providers may use hypertext transfer protocol (HTTP) methods to deliver video content to an endpoint (e.g., a client), and it may be advantageous to multicast the content to the network egress edge to deliver high-concurrency content. The multicast can be converted to unicast at the edge. The endpoint device can then use the unicast HTTP-get method, and is unaware of the multicast optimizations. In some deployments, a residential gateway (or other CPE) may be used to cache the content on a subscriber's premises. If the content is not cached on the gateway and cannot be retrieved via multicast, the gateway can fetch the asset from a mid-level CDN cache.

Certain problems can also arise when using these multicast cache fill methods. For example, the multicast flow is not typically cached at residential gateways and, consequently, the content is not generally available for the first HTTP-get request. A residential gateway can fetch the first fragment from the CDN via unicast and then tune to the multicast flow to cache subsequent fragments. However, when many clients change the channel at the same time, the aggregated cache misses can put a heavy load on the mid-level caches.

Another scenario in which the unicast load can spike is during a packet loss for a multicast flow. There are a number of mechanisms designed to correct for packet loss, but there are circumstances in which all of the packet loss cannot be corrected. When this occurs, a gateway may attempt to fetch the content via unicast from the mid-level caches in the CDN. In the case of correlated loss, many gateways may try to use unicast to fetch the asset, which can lead to excessive delay in providing the endpoint with the asset. Such a delay may, in turn, lead to the endpoint downshifting. The downshift triggers a cache miss at the gateway, which in turn causes a unicast fetch of the asset.

Thus, as with switching on a resource in a switched linear service, cache misses on the network egress edge of an optimized multicast video delivery system can cause instabilities and delay in rendering content when a client changes services or channels.

In accordance with embodiments disclosed herein, distribution system 100 can overcome these shortcomings (and others) by providing alternate media to obfuscate delays of service content delivery, such as may be caused by switching on a pooled resource in a linear switched service or cache misses in an optimized multicast delivery system. In more particular embodiments, an upstream server may be primed with one or more alternate media fragments. The alternate media fragments may be encoded in advance and published to the upstream server. The alternate media fragments may also be cached on the same upstream server or cached closer to the edge of a CDN. For example, an origin server may be primed with alternate media fragments, and a residential gateway may also fetch and cache the alternate media.

The alternate media fragments (also referred to herein as "start-up media fragments" or "start-up content fragments") may contain any suitable data within the start-up content to be viewed at a client during a delivery delay. 'Start-up content' is broad terminology that may include, for example, a slate indicating content will begin soon, one or more advertisements, or a black screen, for example. Additionally, start-up content can be inclusive of start-up media, which can include virtually any information to be provided for a given client, server, etc.

Figure 2:
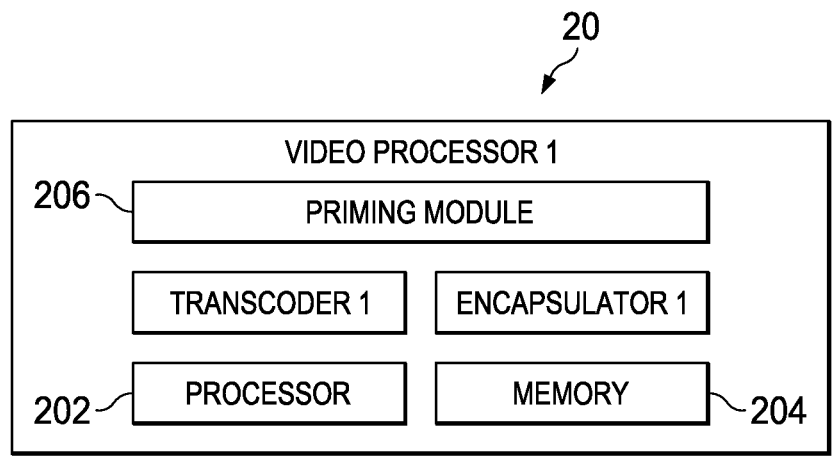
FIG. 2 is a simplified block diagram illustrating additional details that may be associated with one potential embodiment of a video processor in the distribution system.

Turning to FIG. 2, FIG. 2 is a simplified block diagram illustrating additional details that may be associated with one potential embodiment of a video processor 1 (indicated generally at an arrow 20) in distribution system 100. Note that video processor 1 could be provisioned within any of the infrastructure of FIG. 1 (e.g., within origin server 102, within streaming server 104, within client 106, etc.). In general terms, video processor 1 is representative of any video processing element, which is intended to encompass any suitable unit, module, software, hardware, server, program, application, application program interface (API), proxy, processor, field programmable gate array (FPGA), erasable programmable read only memory (EPROM), electrically erasable programmable ROM (EEPROM), application specific integrated circuit (ASIC), digital signal processor (DSP), or any other suitable device, component, element, or object configured to process video data. It may include any suitable hardware, software, components, modules, interfaces, or objects that facilitate the operations thereof. This may be inclusive of appropriate algorithms and communication protocols that allow for the effective exchange (reception and/or transmission) of data or information.

The particular example embodiment of video processor 1 in FIG. 2 generally includes transcoder 1, encapsulator 1, a processor 202, and a memory 204. Note that video processor 1 may include additional hardware and/or software elements, such as priming module 206. Hence, appropriate software and/or hardware may be provisioned in video processor 1 to facilitate the start-up operations described herein. Video processor 1 can also be configured to store, aggregate, process, export, and/or otherwise maintain media or other data in any appropriate format, where these activities can involve processor 202 and memory element 204. Video processor 1 is generally configured to receive information as a signal (e.g., an image signal or a video signal) from a video content source, such as any of sources 1-N.

Although only video processor 1 is illustrated in detail in FIG. 2, any of video processors 2-N or any other element in distribution system 100 may be similarly provisioned. In one example implementation, video content sources 1-N, transcoders 1-M, encapsulators 1-M, origin server 102, streaming server 104, and client 106 are representative of any suitable network element, which is meant to encompass network appliances, servers, routers, switches, gateways, bridges, load balancers, modules, proprietary elements, or any other suitable device, component, element, or object operable to exchange information in a network environment. Network elements may include any suitable hardware, software, components, modules, or objects that facilitate the start-up operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with elements of distribution system 100, each of video content sources 1-N, transcoders 1-M, encapsulators 1-M, origin server 102, streaming server 104, and client 106 can include memory elements for storing information to be used in the operations outlined herein. Each of video content sources 1-N, transcoders 1-M, encapsulators 1-M, origin server 102, streaming server 104, and client 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein (e.g., memory 204) should be construed as being encompassed within the broad term "memory element" or "memory." Information being used, tracked, sent, or received by video content sources 1-N, transcoders 1-M, encapsulators 1-M, origin server 102, streaming server 104, and/or client 106 could be provided in any database, register, queue, table, cache, control list, or other storage structure, all of which can be referenced at any suitable timeframe. Any such storage options may be included within the broad term "memory element" or "memory" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, video content sources 1-N, transcoders 1-M, encapsulators 1-M, origin server 102, streaming server 104, and/or client 106 may include software modules (e.g., priming module 206) to achieve, or to foster the start-up operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of video content sources 1-N, transcoders 1-M, encapsulators 1-M, origin server 102, streaming server 104, and/or client 106 may include a processor that can execute software or an algorithm to perform activities as discussed herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
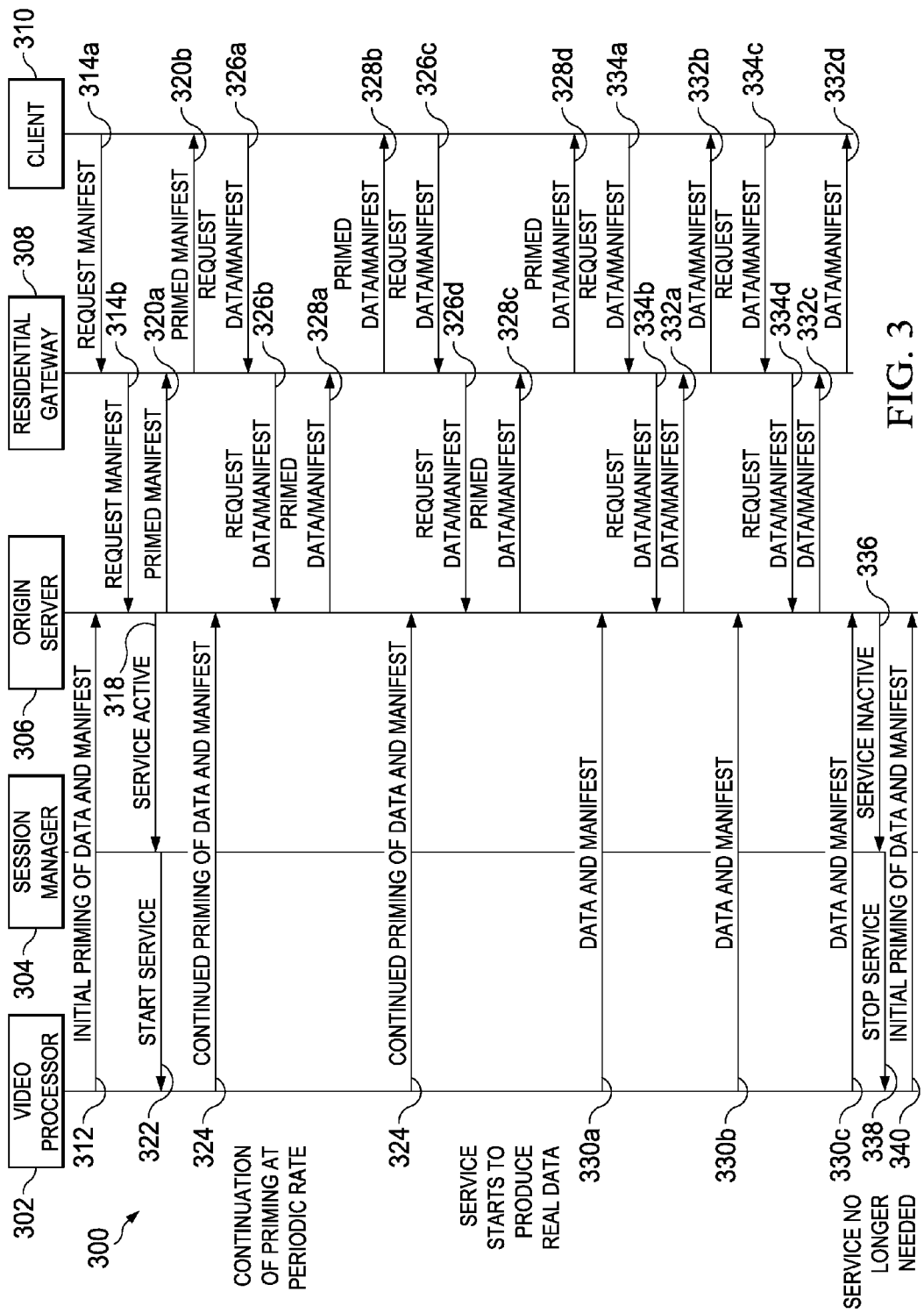
FIG. 3 is a simplified interaction diagram illustrating potential operations that may be associated with example embodiments of the distribution system having a switched linear service.

FIG. 3 is a simplified interaction diagram 300 illustrating potential operations that may be associated with example embodiments of distribution system 100 having a switched linear service. FIG. 3 includes a video processor 302, a session manager 304, an origin server 306, a residential gateway 308, and a client 310. In one particular example embodiment, distribution system 100 may use ABR encoding. Thus, one or more media fragments containing start-up content at various ABR representations may be encoded prior to initializing the switched linear service. Switched services may be initially primed with enough of the start-up content such that a client may request a service and have enough fragments to start playing back the start-up content without significant delay. For example, video processor 302 may prime origin server 306 with start-up content and a manifest at 312.

Client 310 may request a manifest from residential gateway 308 at 314a, which may be forwarded to origin server 306 at 314b. If client 310 is requesting a switched service that is not active, origin server 306 may request activation of the service at 318 and return the primed manifest at 320a-320b. Session manager 304 may allocate, configure, and start video processor 302 for the service at 322. Priming continuation of the start-up content may commence at 324, repeating as necessary until data from video processor 302 becomes available. This priming continuation generally behaves with the expected timing of the service such that subsequent requests at 326a-326d may be responded to with primed data and/or manifests at 328a-328d. For example, video processor 302 may produce data and possibly manifest at periodic intervals. Once service data from video processor 302 becomes available, priming continuation may cease, and video processor 302 can deliver the requested service data and manifest (e.g., at 330a-330c), and origin server 306 can transition to delivering the service content at 332a-332d in response to subsequent requests at 334a-334d.

If the client terminates the service (e.g., changes the channel) and the service is no longer needed (e.g., no other clients are requesting the service), origin server 306 can request service inactivation at 336. Session manager 304 can stop and release video processor 302 at 338 for future use. If required by a given ABR format, the ABR publication point can also be stopped and shut down. The service can be primed again at 340.

In the example embodiment of FIG. 3, the initial priming, continuation priming, and transition to service content is generally implemented by video processor 302, but these operations (or some subset) may also be implemented by other nodes, such as origin server 306 or residential gateway 308, for example. Start-up content may also be cached in any appropriate network element, including origin server 306, residential gateway 308, an edge cache, or any mid-level CDN cache, for example.

Figure 4:
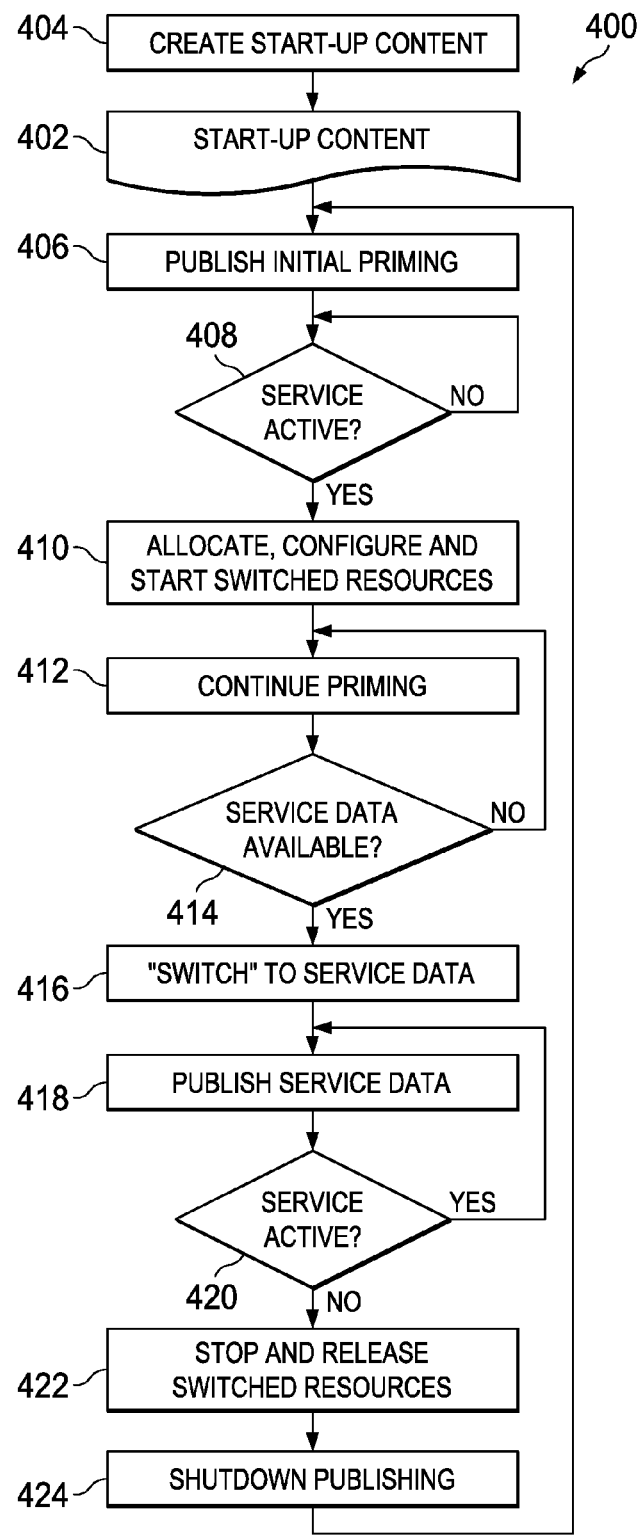
FIG. 4 is a high-level flow diagram of potential operations that may be associated with example embodiments of the distribution system.

FIG. 4 is a high-level flow diagram 400 of potential operations that may be associated with example embodiments of distribution system 100. In some embodiments, such operations may be implemented in video processors 1-M, or more particularly, in a priming module such as priming module 206. In yet other embodiments, some or all of the operations may be implemented in other network elements, such as an origin server or an edge streaming server, for example.

Start-up content 402 may be created at 404 and published for initial priming at 406. For example, any upstream server (e.g., an origin server or edge streaming server) may be primed by publishing start-up content 402 to the upstream server, where it can be cached. If a service associated with start-up media is requested at 408, switched resources may be allocated, configured, and started at 410. Priming can be continued at 412 if service data is not available at 414. In this context, service data is not available if the first service fragment cannot be delivered without delay, such as a delay caused by switching on the service or a cache miss. If service data becomes available at 414, content can be switched to service data at 416. Service data may be published at 418 until the service is no longer active at 420. When the service is not active at 420, the switched resources can be stopped and released at 422. Publishing may be shut down at 424.

FIG. 4 represents a high-level, format-agnostic flow associated with the present disclosure. Operations for initial priming, continuation of priming, and switching from start-up content to service data may vary based on streaming formats, such as HTTP Live Streaming (HLS) and HTTP Smooth Streaming (HSS). An HLS service, for example, can contain multiple streams (e.g., for X different bitrates) with a variant playlist (i.e., a manifest) that lists each stream playlist. A stream playlist generally contains content identifiers, such as uniform resource identifiers or "URIs," that a client can use to download and play content. A client first requests the variant playlist, and then can begin to make decisions about which stream to source. To source stream data, a client can fetch the discrete stream playlist and select which URIs to download. For linear content, stream playlists are updated periodically (the duration of the URI data) yielding information about newly available URIs, and possibly removing information about expired, no longer available URIs.

Figure 5:
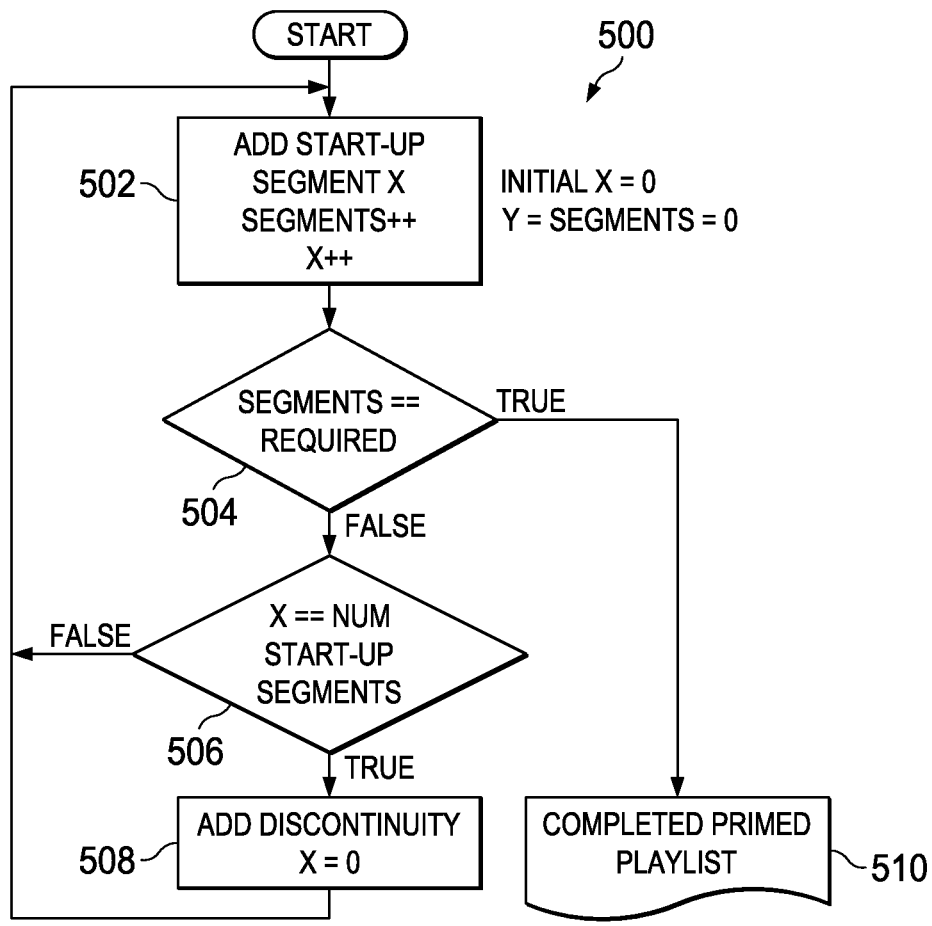
FIG. 5 is a simplified flow diagram of potential operations that may be associated with an example embodiment of the distribution system with HTTP Live Streaming.

FIG. 5 is a simplified flow diagram 500 of potential operations that may be associated with an example embodiment of distribution system 100 with HLS. The initial priming generally includes creating and publishing the variant playlist and each discrete stream playlist. The stream playlists contain sufficient content URIs so that a client may begin download and buffer enough content to start playback. If the start-up content is too short for this, then the content may be repeated with the addition of an HLS discontinuity tag prior to repeating. For example, a start-up segment X can be added to a playlist at 502, where X is a segment index initialized with a value of 0. X and a segment counter Y can be incremented at 502 after a start-up segment is added to the playlist. If the number of segments Y is less than the number of segments Z required for a given client to begin playback at 504 and X is equal to the number of available start-up fragments at 506, then a discontinuity tag may be added to the playlist and X reset to 0 at 508. These operations may repeat until the primed playlist is completed at 510 when the number of segments X in the playlist is equal to the number of segments Z required for the client to begin playback at 504.

Figure 6:
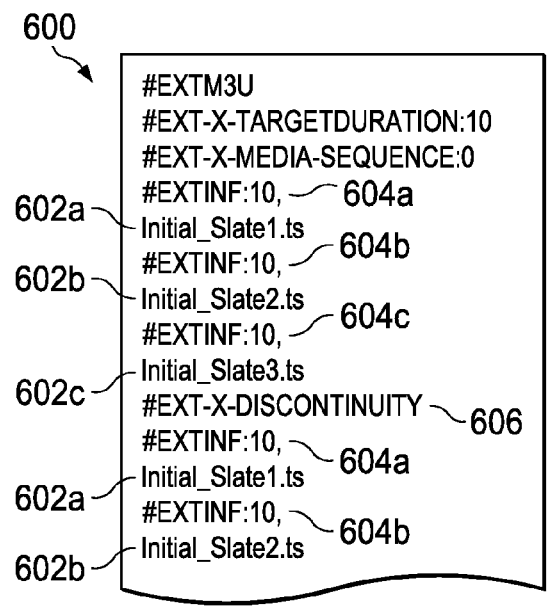
FIG. 6 is a simplified diagram illustrating an initial primed stream playlist for an HTTP Live Streaming service in an example embodiment of the distribution system.

FIG. 6 is a simplified diagram illustrating an initial primed stream playlist 600 for an HLS service in an example embodiment of distribution system 100. In the example of playlist 600, the start-up content is thirty seconds and is segmented into ten-second segments 602a-602c, marked by tags 604a-604c. The client in this example needs at least five segments to begin playback, so discontinuity tag 606 allows segments 602a-602b to be repeated.

Figure 7:
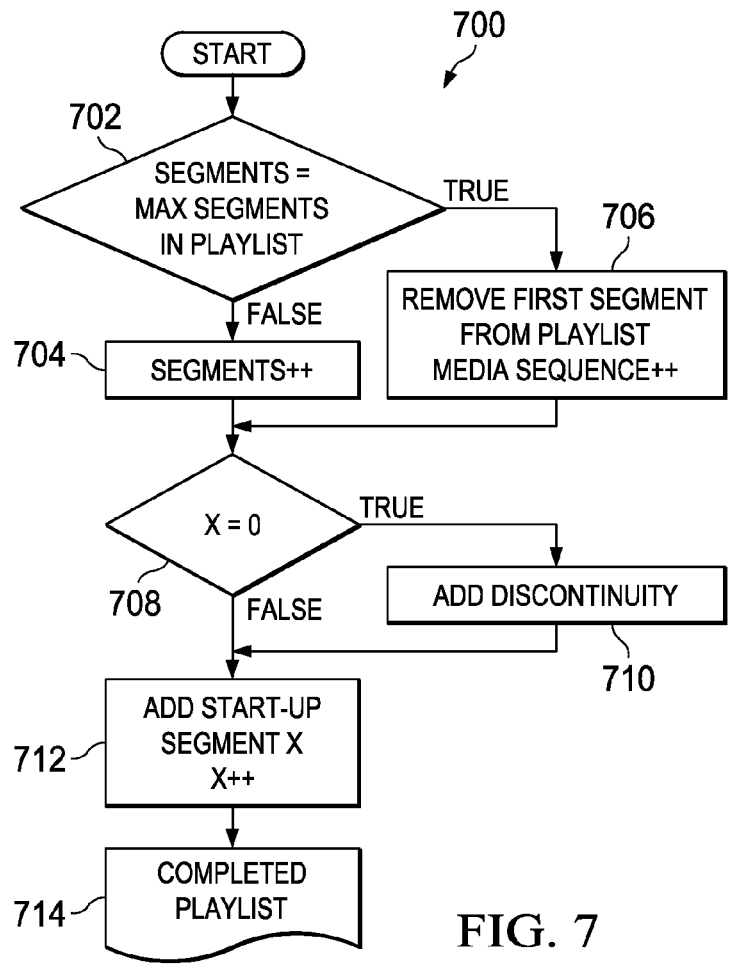
FIG. 7 is a simplified flow diagram illustrating potential operations that may be associated with continuation of priming in an example embodiment of the distribution system with HTTP Live Streaming.

FIG. 7 is a simplified flow diagram 700 illustrating potential operations that may be associated with continuation of priming in an example embodiment of distribution system 100 with HLS. Continuation of priming generally includes updating an initial primed stream playlist, such as playlist 600, at the duration interval of URIs being added to it, rotating through the start-up content, and repeating content as may be needed. If there is a limit on the number of segments in a playlist, then segments may be removed from the start and the sequence number incremented for each removal. For example, if the number of segments in a playlist is less than the maximum number of segments at 702, a new segment can be added to the playlist at 704. However, if the number of segments is equal to the maximum, the top segment can be removed and the sequence number incremented at 706. If the segment to be added is the first start-up segment (i.e., X=0 at 708), a discontinuity tag can be added at 710. The start-up segment may be added and the segment index incremented at 712. The completed playlist can be published at 714.

Figure 8:
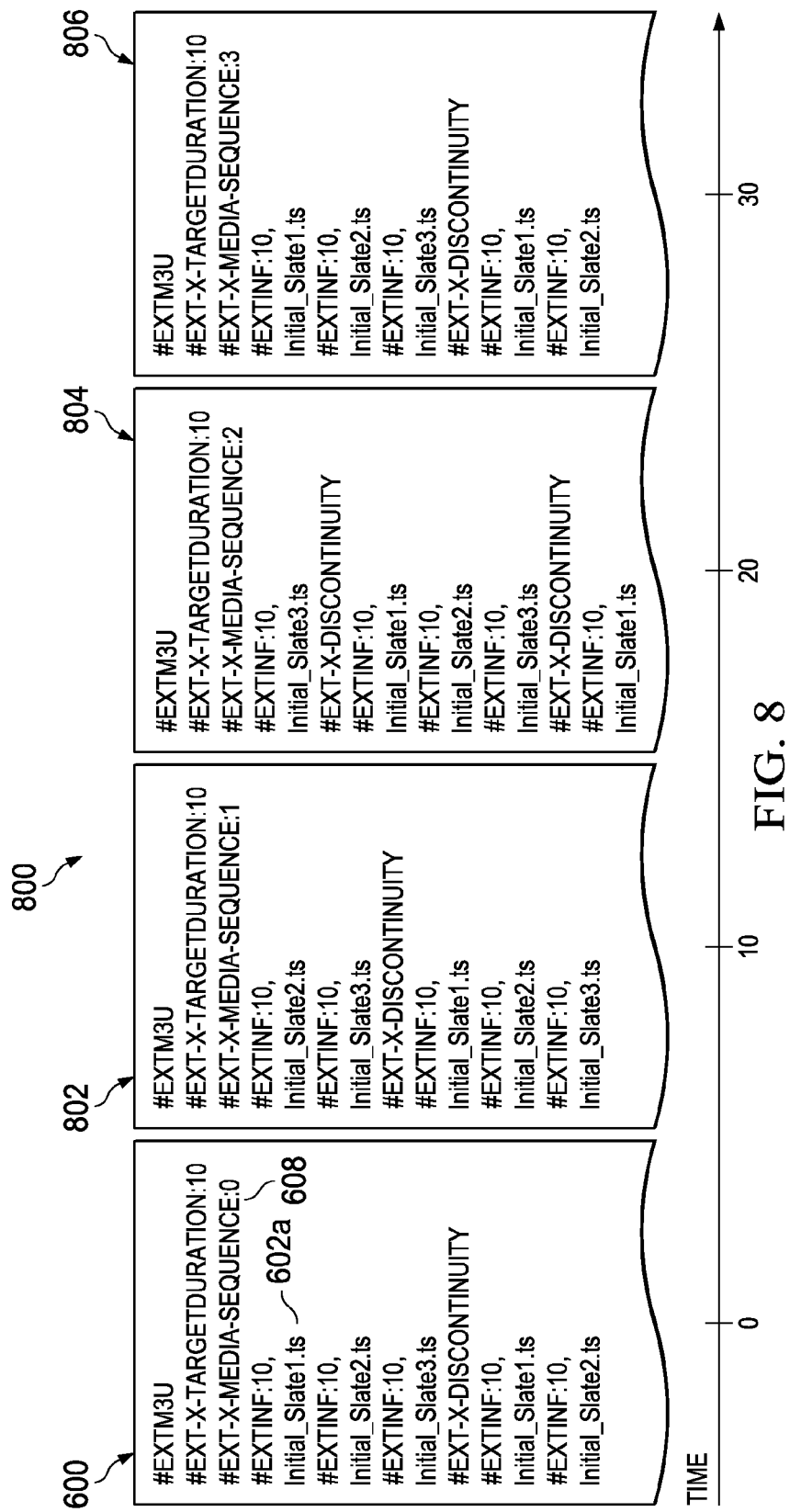
FIG. 8 is a simplified diagram illustrating sample continuation playlists for an HTTP Live Streaming service in an example embodiment of the distribution system.

FIG. 8 is a simplified diagram 800 illustrating continuation playlists 802-806 for an HLS service in an example embodiment of distribution system 100. In FIG. 8, for example, the maximum number of segments for a playlist is five, so priming may be continued at ten seconds by removing segment 602a and incrementing the sequence number in tag 608. The result is illustrated by playlist 802, and subsequently, by playlists 804-806 at twenty and thirty seconds, respectively. In general, priming may continue until a requested service starts to produce service content. Once this occurs, the service content can be used instead of the start-up content in the stream playlist.

Figure 9:
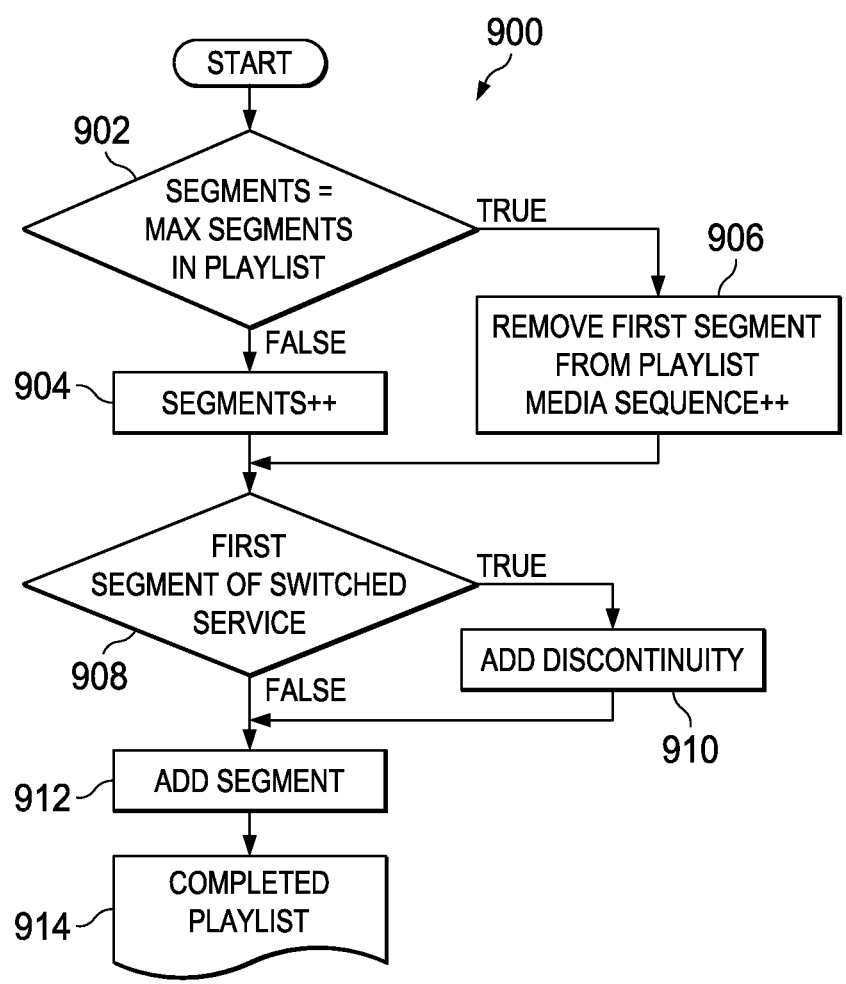
FIG. 9 is a simplified flow diagram illustrating potential operations that may be associated with switching from continuation priming to service content in an example embodiment of the distribution system with HTTP Live Streaming.

FIG. 9 is a simplified flow diagram 900 illustrating potential operations that may be associated with switching from continuation priming to service content in an example embodiment of distribution system 100 with HLS. For example, continuation priming may continue at 902-906 until the requested service becomes available at 908. If the first segment from the requested service is available at 908, a discontinuity may be added to the playlist at 910 before adding the first segment at 912.

Figure 10:
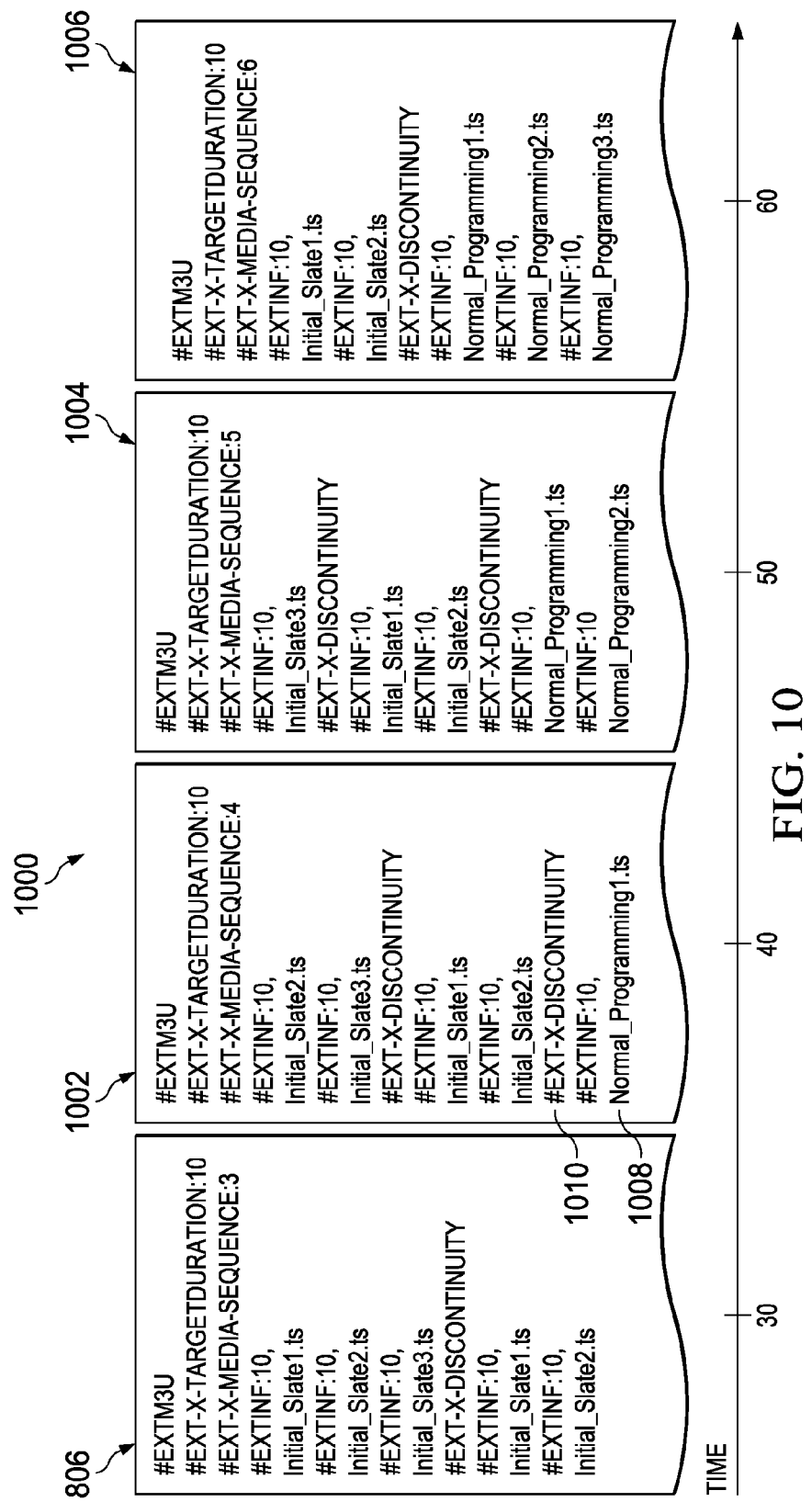
FIG. 10 is a simplified diagram illustrating sample playlists that may be associated with transitioning from primed playlists to service playlists in an example embodiment of the distribution system with HTTP Live Streaming.

FIG. 10 is a simplified diagram 1000 illustrating playlists 1002-1006, which may be associated with transitioning from priming playlists to service playlists in an example embodiment of distribution system 100 with HLS. In the example of FIG. 10, the transition occurs at forty seconds, as illustrated by segment 1008 and discontinuity tag 1010 in playlist 1002. An HSS service may contain multiple streams (for example N different bitrates) with a manifest that describes the properties of each stream, including a template for content URIs. A common timeline is used for each stream perspective (for example, all video streams from the same source will have a common timeline) and the manifest contains timestamps for available URIs, each of which references a stream fragment. The timestamps can be used in the URI template to download fragment data.

Similar to HLS, a standard HSS client expects sufficient content to be available to download and buffer before the client can begin playback, but an HSS client typically only fetches the manifest a single time. Timestamp information to form the URI for future requests can be embedded in the fragment data itself. This embedded timestamp is referred to herein as the "next fragment start time" or "NFST." A fragment also contains its own start time. A fragment's own embedded start time is referred to herein as an "FST." A "start time" may refer to either an FST or an NFST.

Time discontinuities, particularly backwards discontinuities, are not generally supported in an HSS service because the timestamp in HSS is used as part of the URI. There is no notion of signaling a discontinuity. Therefore, if start-up content repeating is needed, duplication and modification of timestamps in start-up content fragment data may be used for initial priming and continuation priming. In some embodiments, operations associated with initial priming and continuation priming may be implemented in an encapsulator or an origin server, for example.

Figures 11, 12A:
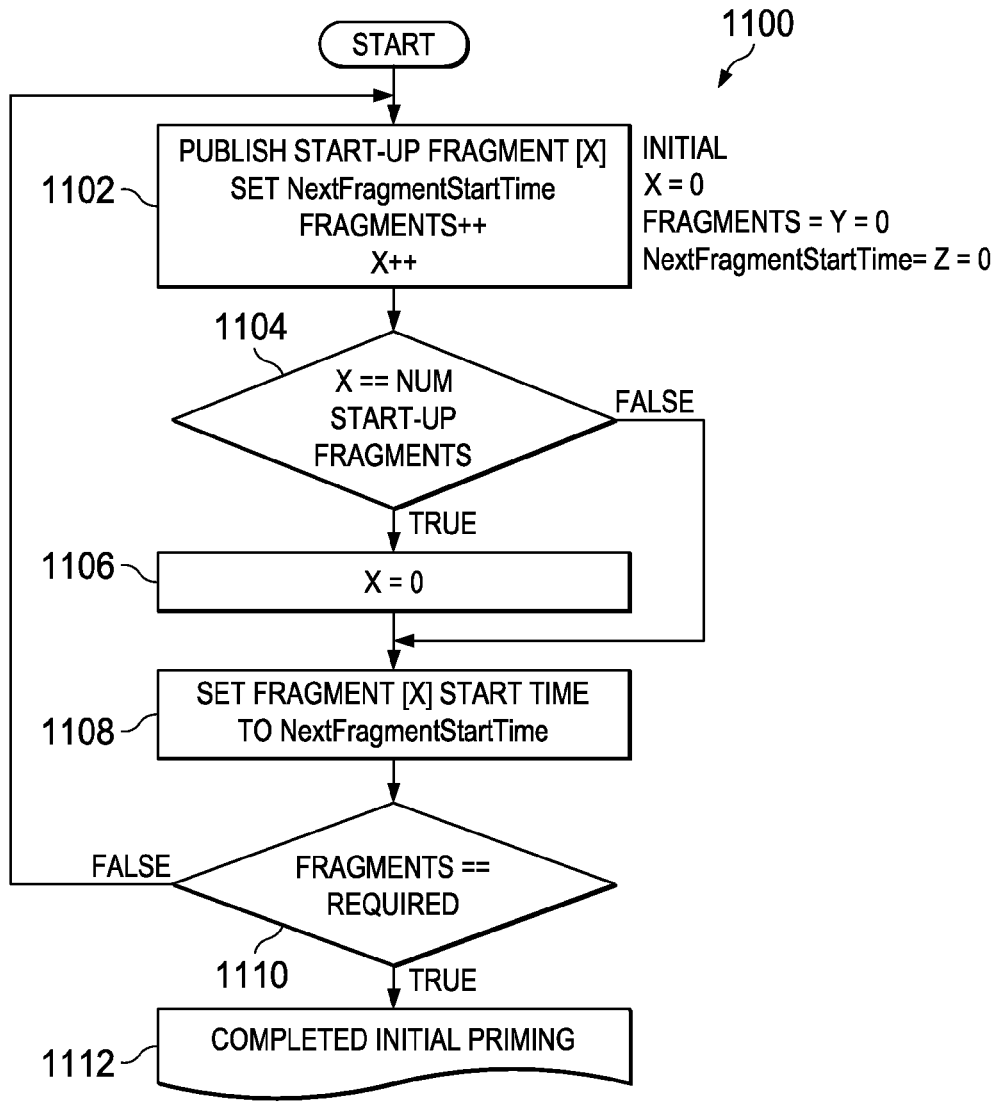
FIG. 11 is a simplified flow diagram illustrating potential operations that may be associated with encapsulator-based priming in example embodiments of the distribution system with an HTTP Smooth Streaming service.
FIG. 12A is a simplified table that illustrates primed fragment start times in one example of encapsulator-based priming.

FIG. 11 is a simplified flow diagram 1100 illustrating potential operations that may be associated with encapsulator-based priming in example embodiments of distribution system 100 with an HSS service. In such embodiments, initial priming generally involves publishing start-up content fragment data to an origin server. During this process, FSTs can be modified when looping start-up content.

Several variables may be initially set to values of zero, including a fragment index X, a fragment counter Y, and a next fragment start time Z. At 1102, a start-up fragment (i.e., fragment[X]) may be published. Z may also be set based on the FST and duration of fragment[X]. X and Y may be incremented following publication. If X is equal to the number of available start-up fragments at 1104, X is reset to zero at 1106. If not, the FST of fragment[X] is set to Z at 1108. If the number of fragments needed for client playback has not yet been published at 1110, priming continues at 1102. If the number of fragments required for playback has been published at 1110, initial priming is complete at 1112. An encapsulator resource may be released after initial priming, but the HSS publishing point should not be stopped. At the time of priming continuation, an encapsulation resource may be reallocated to continue priming until service data is available. Fragment start times may also be modified to fit into the output time domain when service data becomes available. The encapsulation process and HSS publication point may be stopped and shutdown when the service is no longer is use. The initial priming for the service can then be repeated.

FIG. 12A is a simplified table 1200a that illustrates primed fragment start times in one example of encapsulator-based priming. Table 1200a includes fragment numbers 1202, original FSTs 1204, and modified FSTs 1206. In this example, the start-up content is ten seconds and is fragmented into two-second fragments (five total fragments). Ten fragments are sufficient for a client to begin playback in this example. Start-up content can be looped beginning with the sixth fragment. Thus, as shown in table 1200a, the original start time for fragment 6 is modified accordingly to follow fragment 5.

Figures 12B, 13:
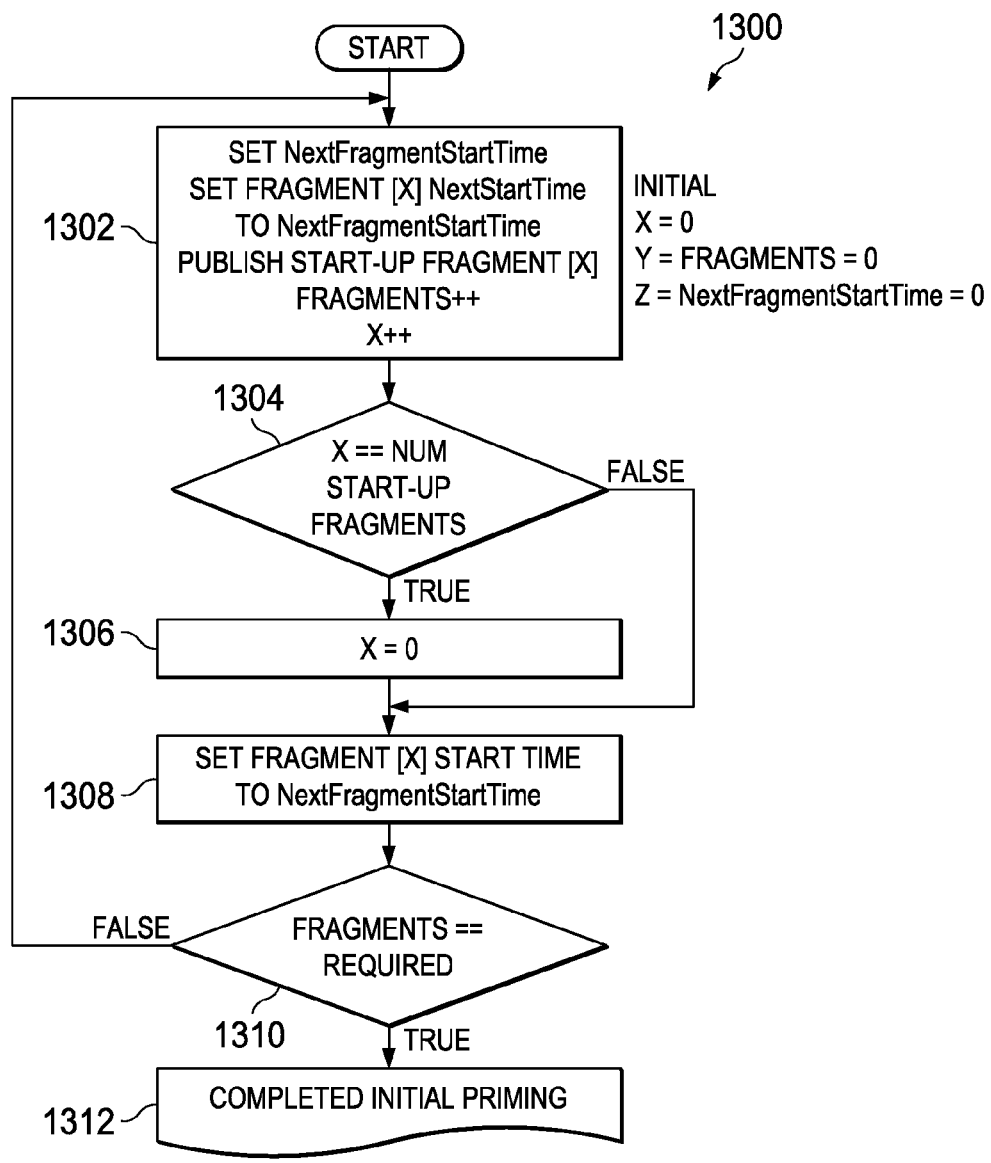
FIG. 12B is a simplified table that illustrates switching from primed fragments to service fragments.
FIG. 13 is a simplified flow diagram illustrating potential operations that may be associated with origin-based priming in example embodiments of the distribution system with an HTTP Smooth Streaming service.

FIG. 12B is a simplified table 1200b that illustrates switching from primed start-up fragments to service fragments in this example (in which service data becomes available at fragment 13). As shown, the original FST for the last start-up content fragment is two seconds, and the modified FST for the last start-up content fragment is twenty-two seconds. Thus, since each fragment in this example is two seconds, the original FST of fragment 13 is modified to follow the last start-up content fragment. Subsequent FSTs of service content fragments may also be modified accordingly.

FIG. 13 is a simplified flow diagram 1300 illustrating potential operations that may be associated with origin-based priming in example embodiments of distribution system 100 with an HSS service. In an HSS service, an origin server generally adds the NFST to a fragment. Thus, fragment N is not available until fragment N+1 has arrived. Until content arrives (e.g., from a switched linear encapsulation process), an origin server may loop start-up content by modifying start-up content FSTs and adding NFSTs. A fragment's NFST equals the sum of the fragment's modified FST and the fragment's duration.

Referring to FIG. 13, for example, several variables may be initially set to values of zero, including a fragment index X, a fragment counter Y, and a next fragment start time Z. At 1302, the NFST of the start-up fragment (i.e., fragment[X]) may be set, the start-up fragment may be published, and X and Y may be incremented. If X is equal to the number of available start-up fragments at 1304, X is reset to zero at 1306. If not, the FST of fragment[X] is set to Z at 1308. If the number of fragments needed for client playback has not yet been published at 1310, priming continues at 1302. If the number of fragments required for playback has been published at 1310, initial priming is complete at 1312.

Figures 14, 15, 16:
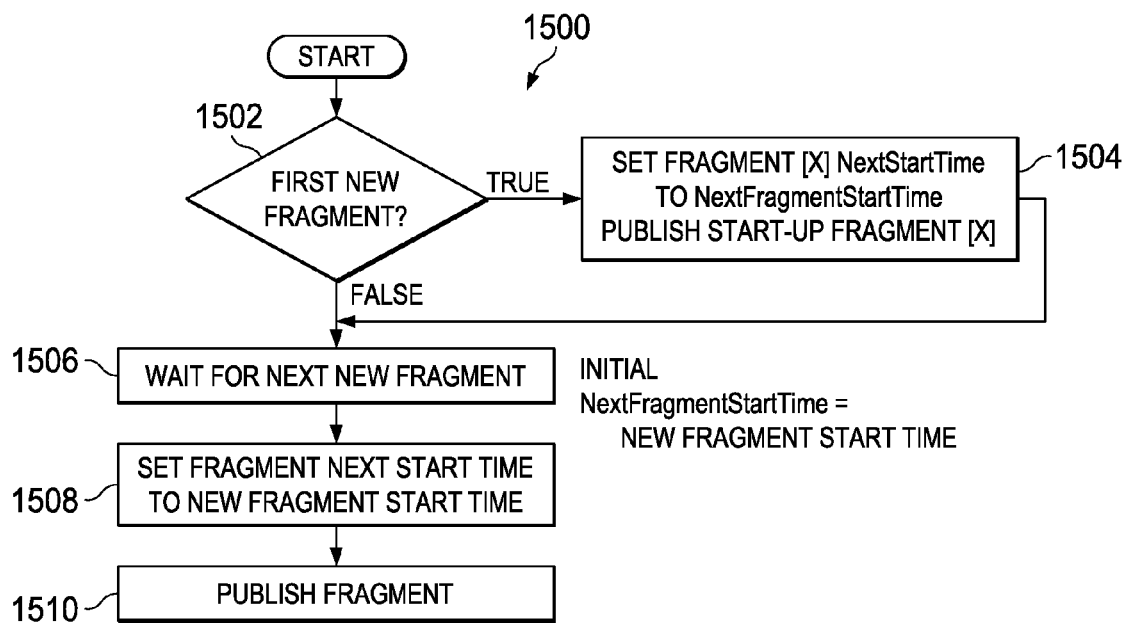
FIG. 14 is a simplified table that illustrates primed fragment start times in one example of origin-based priming.
FIG. 15 is a simplified flow diagram illustrating potential operations that may be associated with switching to service fragments in example embodiments of the distribution system with an HTTP Smooth Streaming service.
FIG. 16 is a simplified table that illustrates switching from primed fragments to service fragments in an example embodiment of the distribution system with an HTTP Smooth Streaming service.

FIG. 14 is a simplified table 1400 that illustrates primed fragment start times (FSTs and NFSTs) in one example of origin-based priming. Table 1400 includes fragment numbers 1402, original FSTs 1404, modified FSTs 1406, and NFSTs 1408. As in the previous example, the start-up content is ten seconds and is fragmented into two-second fragments (five total fragments) in this example, and ten fragments are sufficient for a client to begin playback in this example. As shown in table 1400, an NFST is added to each fragment based on the modified FST. Start-up content is looped beginning with the sixth fragment in this example. Thus, the original start time for fragment 6 is modified to follow fragment 5.

FIG. 15 is a simplified flow diagram 1500 illustrating potential operations that may be associated with switching to service fragments in example embodiments of distribution system 100 with an HSS service. When an origin server receives the first service fragment, the fragment will have an FST, and the origin server has already produced a start-up fragment known to the client with an expected FST, which is the last fragment's NFST generated by the origin server. In the example of FIG. 15, the FST of the first service fragment is greater than or equal to the NFST of the last (i.e., most recent) published start-up fragment. When the first service fragment is received at 1502, the origin server can generate another start-up fragment, set the NFST of this fragment to the first service fragment FST, and publish the start-up fragment at 1504. The next service fragment may be received at 1506, and the service fragment's NFST may be set at 1508. The service fragment can be published at 1510.

FIG. 16 is a simplified table 1600 that illustrates switching from primed fragments to service fragments in the example embodiment illustrated in FIG. 15, in which service data becomes available at fragment 13 with an original FST of 41. Table 1600 includes fragment numbers 1602, original FSTs 1604, modified FSTs 1606, and NFSTs 1608. As shown, the original FST for start-up fragment 11 is 0 seconds, and the modified FST for start-up fragment 11 is 20 seconds. Thus, in this particular embodiment, another start-up fragment (i.e., fragment 12) is produced. Since each fragment in this example is two seconds, the original FST of fragment 12 is modified to follow start-up content fragment 11. The NFST of fragment 12 is set based on the FST of the first service fragment (fragment 13).

Figures 17, 18:
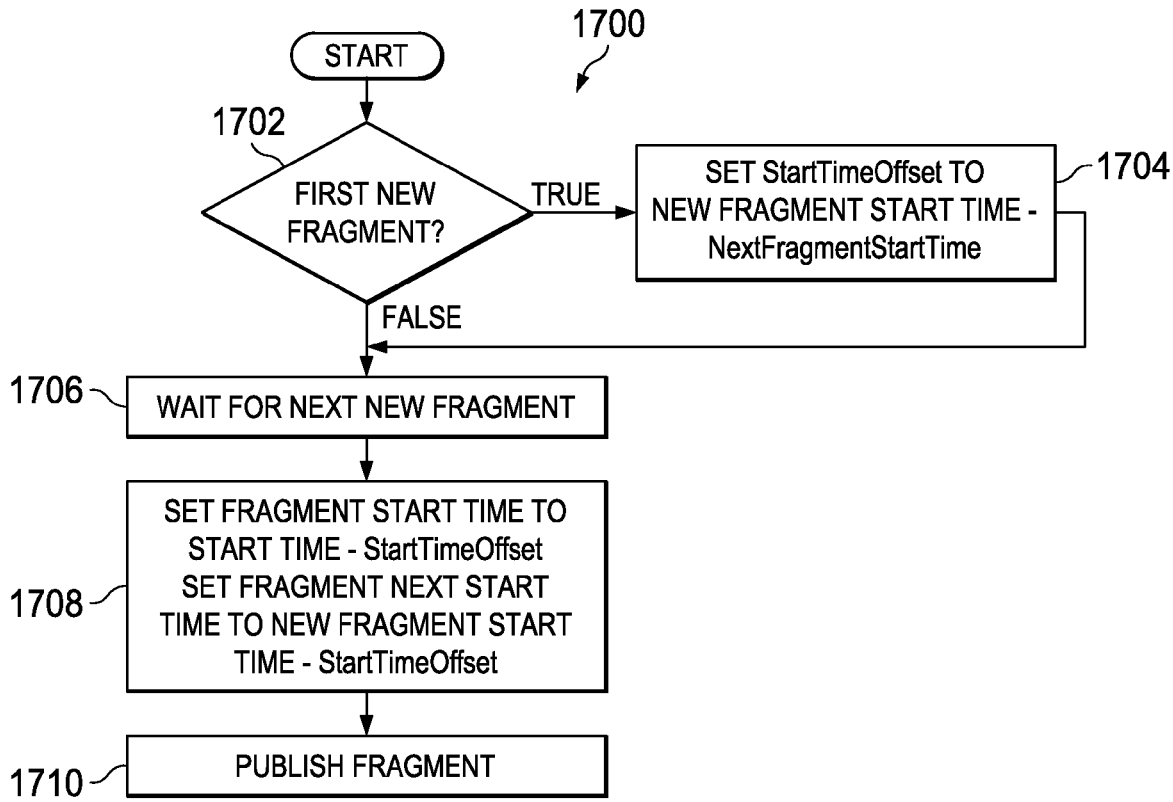
FIG. 17 is a simplified flow diagram illustrating potential operations that may be associated with switching to service fragments in other example embodiments of the distribution system with an HTTP Smooth Streaming service.
FIG. 18 is a simplified table that illustrates switching from primed start-up fragments to service fragments in an example embodiment of the distribution system with an HTTP Smooth Streaming service.

FIG. 17 is a simplified flow diagram 1700 illustrating potential operations that may be associated with switching to service fragments in other example embodiments of distribution system 100 with an HSS service. In the example of FIG. 17, the FST of the first service fragment is greater than or equal to the NFST of the last published start-up fragment. In general, an origin server in such embodiments can subtract from the FST of incoming fragments the difference between the FST of the first service fragment and the NFST of the last fragment produced. For example, when the first service fragment is received at 1702, an offset value may be calculated at 1704, where the offset value is the difference between the first service fragment FST and the NFST in the last start-up fragment. The next service fragment may be received at 1706. At 1708, the modified FST of a service fragment may be calculated by subtracting the offset value from the original FST, and the NFST may be calculated by subtracting the offset value from the next service fragment FST. The service fragment can be published at 1710.

FIG. 18 is a simplified table 1800 that illustrates switching from primed start-up fragments to service fragments in the example embodiment illustrated in FIG. 17, in which service data becomes available at fragment 13 with an original FST of 41. Table 1800 includes fragment numbers 1802, original FSTs 1804, modified FSTs 1806, and NFSTs 1808. As shown, the original FST for start-up fragment 11 is 0 seconds, and the modified FST for start-up fragment 11 is 20 seconds. Thus, in this particular embodiment, another start-up fragment (i.e., fragment 12) is produced. Since each fragment in this example is two seconds, the original FST of fragment 12 is modified to follow start-up content fragment 11 with a modified FST of 22 seconds. Since the duration of fragments is 2 seconds in this example, the modified FST of the first service fragment (fragment 13) is 24 seconds. The offset value between the original FST (41) and the modified FST (24) is 17. Thus, 17 seconds is subtracted from start times of service fragments.

FIG. 19 is a simplified flow diagram 1900 illustrating potential operations that may be associated with switching to service fragments in other example embodiments of distribution system 100 with an HSS service. In the example of FIG. 19, the first service fragment has an original FST that is less than the NFST of the last published start-up fragment. In general, an origin server in such embodiments can add to the start time of incoming fragments the difference between the NFST of the most recent start-up fragment and the original FST of the first service fragment. Thus, the first service fragment in such an embodiment would have an FST matching the NFST of the most recent start-up fragment. For example, when the first service fragment is received at 1902, an offset value may be calculated at 1904, where the offset value is the difference between the NFST in the most recent start-up fragment and the first service fragment FST. The next service fragment may be received at 1906. At 1908, the modified FST of a service fragment may be calculated by adding the offset value to the original FST, and the NFST may be calculated by adding the offset value to the next service fragment's FST. The service fragment can be published at 1910.

FIG. 20 is a simplified table 2000 that illustrates switching from primed start-up fragments to service fragments in the example embodiment illustrated in FIG. 19, in which service data becomes available at fragment 13 with an original FST of 0. Table 2000 includes fragment numbers 2002, original FSTs 2004, modified FSTs 2006, and NFSTs 2008. As shown, the original FST for start-up fragment 11 is 0 seconds, and the modified FST for start-up fragment 11 is 20 seconds. Thus, in this particular embodiment, another start-up fragment (i.e., fragment 12) is produced. Since each fragment in this example is two seconds, the original FST of fragment 12 is modified to follow start-up content fragment 11 with a modified FST of 22 seconds. Since the duration of fragments is 2 seconds in this example, the modified FST of the first service fragment (fragment 13) is 24 seconds. The offset value between the modified FST (24) and the original FST (0) is 24. Thus, 24 seconds may be added to start times of service fragments.

Distribution system 100 may provide significant advantages, some of which have already been discussed. For example, some embodiments of distribution system 100 can provide a temporary feed to a client until a switched service becomes available, and the client remains unaware that a linear service may be started after an initial manifest request. From the client's perspective, the linear service was available upon request. Thus, distribution system 100 can improve the media experience while eliminating the need for special client handling of an unavailable service in switched linear use cases due to start-up delay, or when a unicast load associated with a channel change could cause periods of unresponsiveness to a viewer. Distribution system 100 may be particularly advantageous for distributing video, but is also readily applicable to other types of streaming media, including radio streaming. Distribution system 100 may also be particularly advantageous to service providers for optimizing transcoding and/or encapsulation resources for switched linear and video-on-demand, or to any provider of content delivery networks or rate-adaptive video playout devices.

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that distribution system 100 is readily scalable and can accommodate a large number of components, as well as more complicated/sophisticated arrangements and configurations. Accordingly, the examples provided should not limit the scope or inhibit the broad teachings of distribution system 100 as potentially applied to a myriad of other architectures. Additionally, although described with reference to particular scenarios, where a particular module, such as priming module 206, is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, distribution system 100. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by distribution system 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method implemented by an apparatus, the method comprising:
   receiving, by the apparatus, a request for a linear media service;
   adding, by the apparatus, a discontinuity tag in a playlist in response to a determination that a duration of a segment of start-up content identified in the playlist is less than a duration to start playback of the linear media service, the start-up content identified by a uniform resource identifier (URI) in the playlist;
   in response to determining that the linear media service is not available, transmitting, from the apparatus, the playlist to a server; and
   switching from publishing the start-up content to publishing the linear media service if the linear media service becomes available.

2. The method of claim 1, wherein the server is an origin server.

3. The method of claim 1, wherein the server is residential gateway.

4. The method of claim 1, further comprising:
   looping the start-up content if a duration of the start-up content is less than the duration to start the playback, wherein the start-up content is cached on the server before the receiving the request, and the start-up content is periodically published to the server after the receiving the request until the switching to publishing the linear media service.

5. The method of claim 1, further comprising:
adding the segment of the start-up content to the playlist, wherein the discontinuity tag loops the segment in the playlist.

6. The method of claim 1, wherein the switching to publishing the linear media service comprises adding a discontinuity tag to the playlist before adding a first segment from the linear media service to the playlist.

7. The method of claim 1, wherein the discontinuity tag is added in the playlist in response to a determination that a number of segments in the playlist is less than a number of segments to start the playback.

8. The method of claim 1, wherein the discontinuity tag precedes the URI in the playlist.

9. The method of claim 1, further comprising:
adding a discontinuity tag, if a segment to be added to the playlist is a first segment of start-up content.

10. Logic encoded in one or more non-transitory media that includes code for execution and, when executed by one or more processors, is operable to perform operations comprising:
receiving a request for a linear media service;
adding a discontinuity tag in a playlist in response to a determination that a duration of a segment of start-up content identified in the playlist is less than a duration to start playback of the linear media service, the start-up content identified by a uniform resource identifier (URI) in the playlist;
in response to determining that the linear media service is not available, transmitting the playlist to a server; and
switching from publishing the start-up content to publishing the linear media service if the linear media service becomes available.

11. The logic of claim 10, wherein the server is an origin server.

12. The logic of claim 10, wherein the server is a residential gateway.

13. The logic of claim 10, the operations further comprising:
looping the start-up content if a duration of the start-up content is less than the duration to start the playback; and
periodically publishing the start-up content to the server after the receiving until the switching.

14. The logic of claim 10, the operations further comprising:
adding the segment of the start-up content to the playlist, wherein the discontinuity tag loops the segment in the playlist.

15. The logic of claim 10, wherein the switching to publishing the linear media service comprises adding a discontinuity tag to the playlist before adding a first segment from the linear media service to the playlist.

16. An apparatus, comprising:
a processor;
a memory coupled to the processor; and
a priming module coupled to the processor, wherein
the processor is operable to execute instructions, such that
the apparatus is configured to receive a request for a linear media service;
the processor is configured to add a discontinuity tag in a playlist in response to a determination that a duration of a segment of start-up content identified in the playlist is less than a duration to start playback of the linear media service, the start-up content identified by a uniform resource identifier (URI) in the playlist; and
the apparatus is further configured to transmit, in response to a determination that the linear media service is not available, the playlist to a server, and to switch from publishing the start-up content to publishing the linear media service if the linear media service becomes available.

17. The apparatus of claim 16, wherein the processor is configured to add a discontinuity tag to the playlist before adding a first segment from the linear media service to the playlist.

18. The apparatus of claim 16, wherein the apparatus is a residential gateway.

19. The apparatus of claim 16, wherein the apparatus is further configured to loop the start-up content if a duration of the start-up content is less than the duration to start the playback, and to periodically publish the start-up content to the server after the apparatus receives the request until the apparatus switches to publishing the linear media service.

20. The apparatus of claim 16, wherein the processor is further configured to add the segment of the start-up content to the playlist; and add a discontinuity tag to loop the segment in the playlist.

* * * * *